Figures 1, 2:
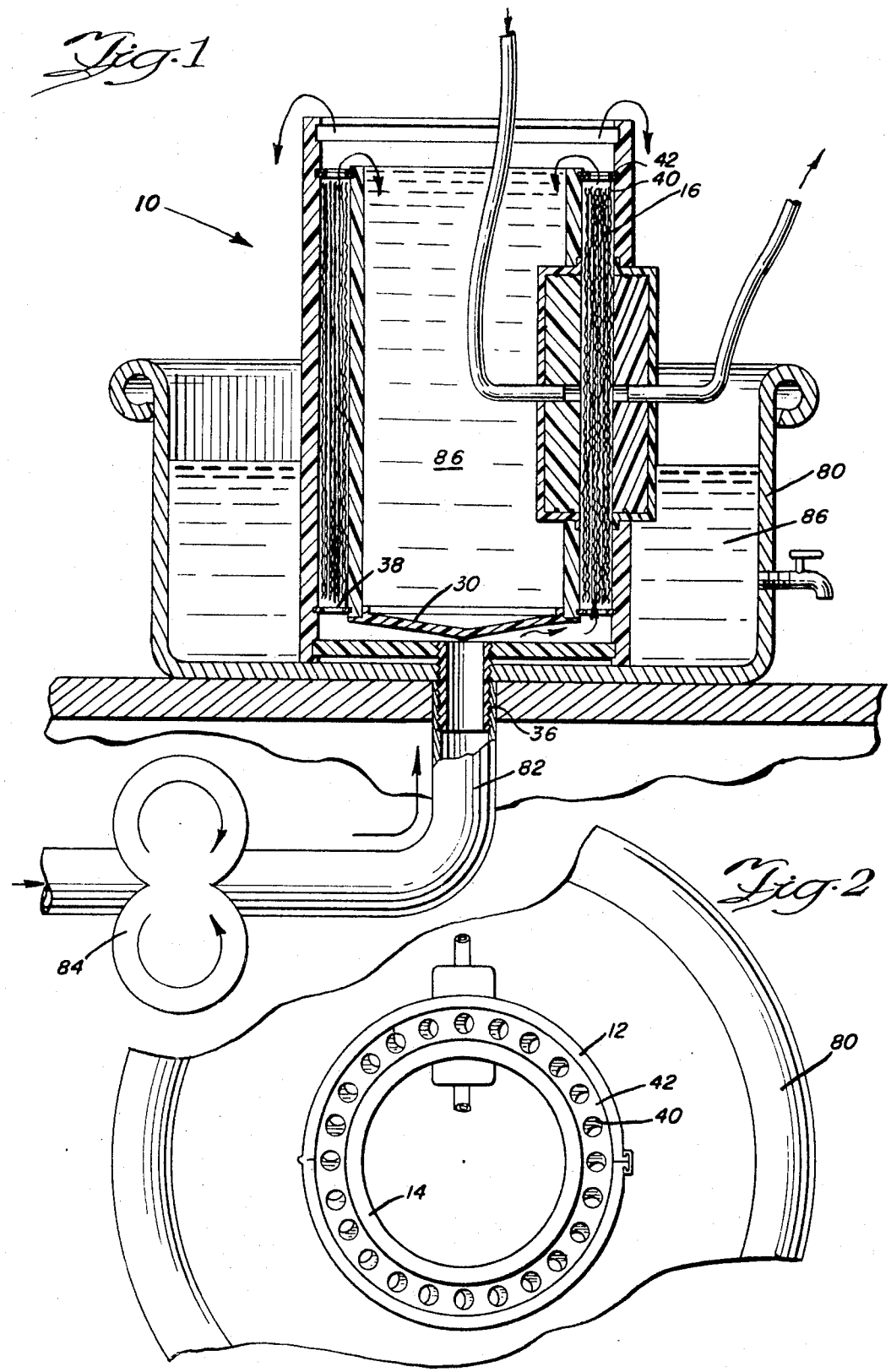

United States Patent [19]
Martinez

[11] 3,857,785
[45] Dec. 31, 1974

[54] ARTIFICIAL KIDNEY APPARATUS

[75] Inventor: F. Jesus Martinez, Palatine, Ill.

[73] Assignee: Baxter Laboratories, Morton Grove, Ill.

[22] Filed: Oct. 18, 1972

[21] Appl. No.: 298,725

Related U.S. Application Data

[62] Division of Ser. No. 26,547, April 8, 1970, Pat. No. 3,712,474.

[52] U.S. Cl.................................. 210/321, 210/494
[51] Int. Cl............................................ B01d 31/00
[58] Field of Search ............ 210/321, 494; 285/260, 285/423, 382.2

[56] References Cited
UNITED STATES PATENTS
3,208,757  9/1965  Jageman.......................... 285/260 X
3,508,662  4/1970  Miller............................. 210/494 X Primary Examiner—Frank A. Spear, Jr.

[57] ABSTRACT

An artificial kidney apparatus providing a blood compartment which is entirely self-contained within its own structure. The apparatus further provides, in the self-contained assembly, structure to vary the positive pressure within a dialysate chamber and the pressure gradient across the diffusion membrane. Improved connector units provide uniform blood distribution into the diffusion membrane.

4 Claims, 9 Drawing Figures

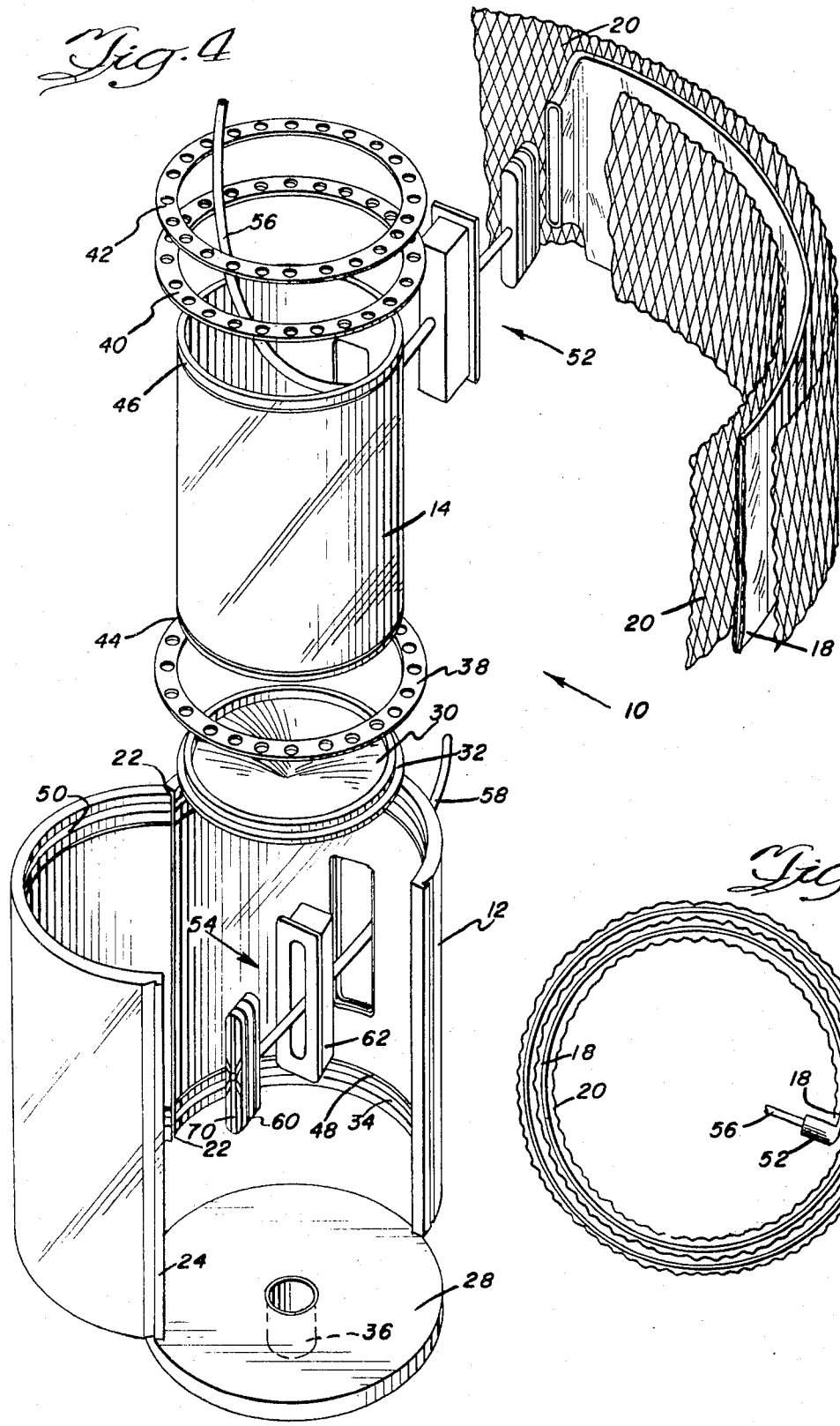

3,857,785

ARTIFICIAL KIDNEY APPARATUS

CROSS REFERENCE RELATED APPLICATION

This application is a division of application Ser. No. 26,547, filed Apr. 8, 1970, now U.S. Pat. No. 3,712,474.

The present invention relates to an artificial kidney apparatus and particularly to an artificial kidney apparatus which, of itself, is a self-contained unit. The invention also provides in a self-contained unit a novel means to adjust the pressure gradient across a semipermeable membrane thereby to effect ultrafiltration during dialysis. Additionally, the invention relates to a unique form of connector for connecting the dialyzer blood inlet-outlet tubing and membrane in an extracorporeal system.

The need for dialyzing equipment is well-known. To fill this need the medical profession is constantly investigating new forms of apparatus which will constitute an advance over those apparatuses which are in existence. Consequently, the prior art is replete with artificial kidney devices of one form or another which are capable of performing to various degrees of satisfaction. Generally, the prior art devices because of the requirement that the dialysis procedure be carried out with care and accuracy have been relatively complex in construction and expensive in cost. Consequently, artificial kidney devices have not been readily obtainable for use by those individuals which because of failure of the normal bodily functions, require dialysis to sustain life.

While the present invention is not directed to the dialysis procedure per se it rather being directed to the means for accomplishing or carrying out the precedure a few words on the subject are felt to be in order for a more complete understanding of the invention.

Generally, dialysis is accomplished by flowing a biological fluid, in this case blood, past a semipermeable membrane which forms a physical barrier between the blood and a dialyzing fluid or wash solution flowing on the other side of the membrane. In an extracorporeal device, such as disclosed herein, there is passive physical diffusion of organic and inorganic substances across the semipermeable membrane as a consequence of driving force (chemical concentration gradient) from two moving fluids on either side of the semipermeable membrane.

Dialysis may be accomplished by using a membrane, in the form of a sheath-like tube, which is wrapped as in a coil dialyzer or which is flat as in a film dialyzer. These membrane devices are generally supported throughout the membrane length by a supporting screen. The supporting screen functions to keep adjacent layers or wraps of membrane apart from one another and generally provides, even though the membrane is supported, that the significant part of the membrane surface will be unobstructed to the contact of the dialyzing fluid. Dialysis may also be accomplished by the implementation of non-supported membranes but the present invention is directed to a device of the supported membrane type and particularly to a coil type dialyzer.

In a form of dialyzer which exists in the prior art at least a single extended length of membrane and supporting screen is wrapped about a core member with the screen in all radial location positioned on both sides of the membrane. A pneumatic cuff element or similar structure is employed to secure the wrap about the core member. This assembly is then disposed within a coil holder or cannister including a cannister pressure lid to effect or compensate for ultrafiltration, the diffusion of water across a membrane. The pressure lid provides sealed means through which passes the blood inlet-outlet tubing. The inlet-outlet tubing is connected to the membrane ends thereby providing a closed extracorporeal system. Blood is caused to flow through the system and dialyzing fluid within a single pass or recirculation system is pumped into the coil holder and over the membrane outer surface of the membrane or blood compartment to cause a diffusion of organic and inorganic substances from the blood.

Ultrafiltration, while a consequence or a function of many dialyzer characteristics, is considered to be most importantly determined by the trans-membrane pressure gradient, area of dialyzer and perfusion flow rate which in and of themselves are of a complex nature, and outside of the scope of this invention. Therefore, very broadly, by adjusting the pressure within the dialysate chamber or on the dialysate side of the membrane in the dialyzer the amount of water diffusion through the membrane can be adjusted. Since the blood on the blood side of the membrane in a coil dialyzer is submitted to a higher pressure than is the pressure on the dialysate side of the membrane an increase in pressure of the latter, causing a reduction in the pressure gradient, will effectively reduce the amount of water removed from the plasma. As indicated, the prior art provides a cannister lid for the coil holder including means to change the resistance to dialysate outflow, therefore, creating positive dialysate pressure within the cannister.

The present invention provides an artificial kidney coil of a self-contained construction; a kidney coil which incorporates within the self-contained unit a positive pressure control for the dialysate chamber; and a kidney coil which utilizes a unique form of connector member for connection of the dialyzing membrane to the blood inflow-outflow tubing. In this context the invention provides an artificial kidney coil having a relatively uncomplex construction, therefore being less expensive to manufacture and relatively easier to operate; and because of the self-contained construction obviates the need for support structure heretofore required. Further, the invention provides an artifical kidney coil which can be used with the assurance of accuracy and efficiency.

Thus, in accordance with an aspect of the present invention, the artificial kidney coil is constructed such that the blood compartment includes a blood path which is entirely self-contained within its own supporting structure.

As hereinafter described in more detail, the kidney coil of the present invention comprises an outer casing which is closed at one end by an end plate including a centrally located dialysate inflow spout and connector for connecting the casing interior to a source of dialyzing fluid. The flow space for the dialyzing fluid is defined by an inner core which is received within the outer casing and supported between the inflow spout and the open end. The inner core provides a support surface upon which the sheath-like dialyzing tube membrane and its supporting screen is wrapped. The respective ends of the sheath-like membrane are connected by connectors carried by the inner core and the outer casing. These connectors serve to introduce and withdraw from the dialyzer priming solution and blood for dialysis and to connect the dialyzer to the patient for infusion of dialyzed blood. The device, additionally, includes a closure for the inner core adjacent to the inflow spout which is appropriately contoured so that the dialyzing fluid is, first, substantially uniformly distributed toward the inner wall of the outer casing. Uniform distribution of dialyzing fluid upwardly throughout the space within which the membrane is disposed results through the implementation of a perforated diverter surrounding the base of the inner core. The diverter, in the embodiment to be described, also provides support for the bottom of the inner core. The diverter also prevents any physical shifting of the supporting screening.

In accordance with a further aspect of the present invention, a means for varying the pressure within the dialysate chamber and consequently the pressure gradient across the membrane thereby to effect ultrafiltration is built into the self-contained unit. In this connection a preferred form of the invention utilizes a pair of annular perforated rings mounted closely adjacent one another surrounding the top of the inner core. By mounting the rings in adjacent fashion and providing for adjustment of one ring relative to the other the resistance to outflow of dialysate is changed due to a variation in the size of the several outflow parts.

The rings, as the lower diverter, similarly provide top support for the inner core within the outer casing. The upper rings serve, also, to prevent any physical shifting of the supporting screening.

According to a further aspect of the present invention, the connectors for both the inflow of blood to and the outflow of blood from the system are in the form of a resilient plastic body of elongated dimension in one direction. Each connector cooperates with a holder piece of complementary configuration which is received by the wall of the inner core and outer casing. The particular size and unique cross-section of the body is adapted to more readily receive without undue gathering or folding of the thin sheath-like membrane. This aids in the prevention of pooling of blood at the inflow point. Provision of a projecting resilient ring acts to seal the membrane between the body and the holder piece which readily connects with the unit. Suitably the face of the holder piece is contoured to conform with the contour of either the inner core or the outer casing.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Figure 6:
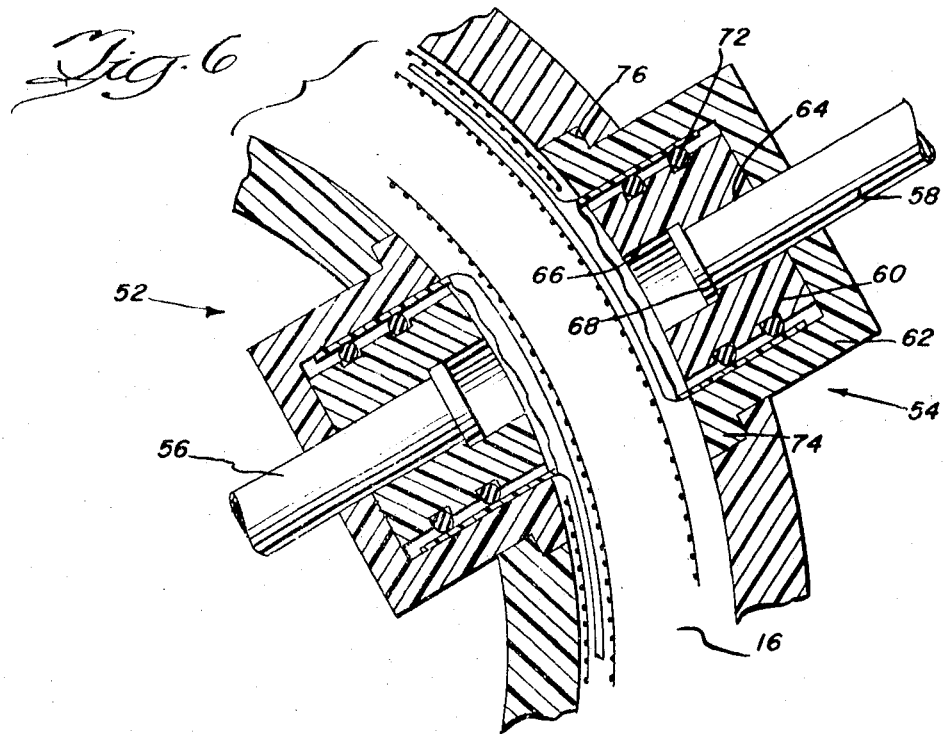
Figure 7:
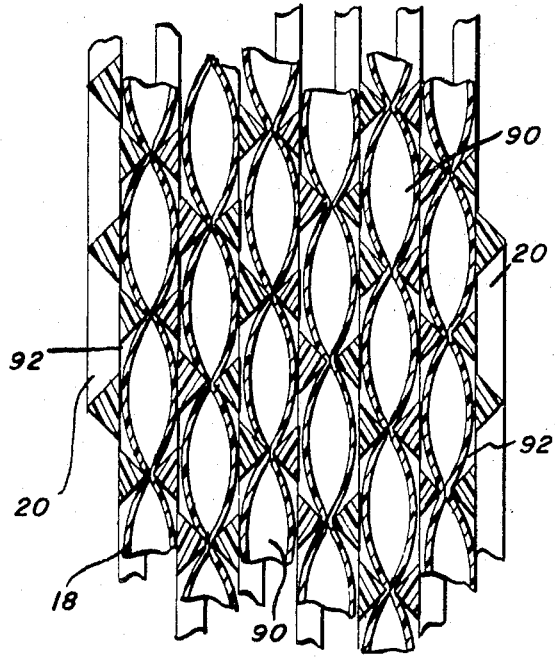
Figure 8:
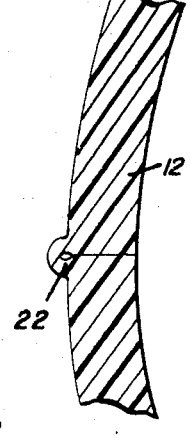
Figure 9:
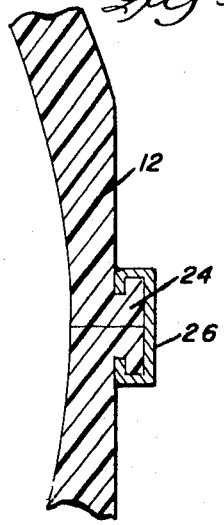

The accompanying drawings show a preferred embodiment of the present invention and form a part thereof. By these drawings, FIG. 1 is a side elevation partially in section of the self-contained artificial kidney coil supported by a dialysate delivery fitting in a tank system, FIG. 2 is a top plan view of the artificial kidney coil in the environment of FIG. 1, FIG. 3 is a diagrammatic perspective view of the supporting screen and dialyzing tubing wrapped about a core member, FIG. 4 is an exploded perspective of the several components forming the self-contained artificial kidney coil, FIG. 5 is a diagrammatic plan view of the dialyzing tubing and supporting screen, FIG. 6 is a view in cross-section of the connectors members for connecting the dialyzing membrane to the blood inflow-outflow tubes, FIG. 7 is a representation of the dialyzing membrane and internal blood conducting channels impressed therein by the support screening, FIG. 8 is a partial view of the outer casing and hinge, and FIG. 9 is a partial view of an opposed side of the outer casing showing a means for hooking casing sections.

Figure 3:
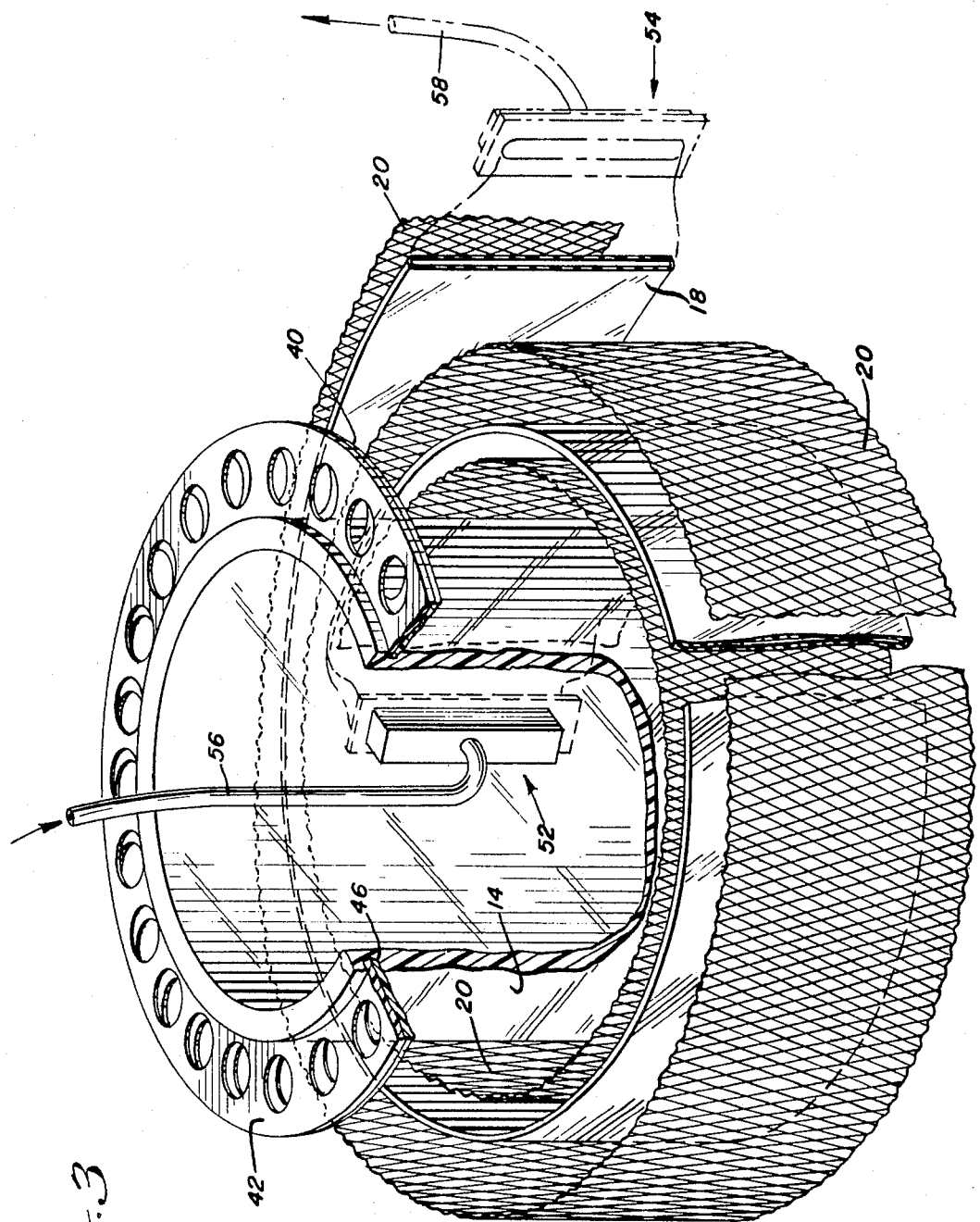

The several component parts of the self-contained artificial kidney coil of the present invention may be seen to best advantage in the diagrammatic perspective and exploded perspective presentations of FIGS. 3 and 4. The kidney coil which is generally referred to by the numeral 10 includes an outer casing 12 and an inner core 14 received and supported within the casing, the outer casing creating the self-contained unit.

Both the outer casing and inner core, in a preferred embodiment, are of cylindrical construction; and the inner core has a smaller outer diameter than the inner diameter of the outer casing thereby to provide an annular space 16(FIG. 1). The space 16 may also be of a regular cross-section other than circular but for ease in wrapping both the sheath-like membrane tube 18 forming the blood compartment and the supporting screen 20 upon the core 14 a circular cross-section is preferred.

Assembly of the component structure within the outer casing 12 may be simplified by providing a hinge 22 which runs the length of the casing and allows it to swing to an open position. A lip 24 formed at the break in each of the opposed casing walls assures that the casing may be securely closed by a substantially U-shaped clamp 26 (FIG. 9).

Each of the outer casing 12 and the inner core 14 are open at the ends. Therefore, closure members are provided to close one of the ends of each unit. In this connection a bottom closure plate 28 is provided for closing the lower end (directions are with reference to the operative disposition of the unit as in FIG. 4) of the outer casing and a deflector plate 30 is provided to close the lower end of the inner core 14. The latter plate which, in the upper peripheral region, displays an annular cut-out portion to define a shoulder 32 is frictionally or otherwise received within the central opening of the inner core to close the core interior, other than at the top. The top may also be sealed, as desired, with provision, however, for allowing outward passage of one of the blood inflow-outflow tubes as will be discussed.

The closure plate 28 is supported internally of the outer casing by means of a circular groove 34 formed in the inner casing. This plate is readily received for closure of the casing since the casing is capable of being hinged open. A spout or conduit 36 carrying external threads extends through the plate for purposes later discussed.

A lower perforated ring 38 and a pair of upper perforated rings 40 and 42, among other functions, serve to provide end stability for the inner core 14 and stationarily support the core within the outer casing 12. The lower ring and each of the upper rings are received by the inner core within the annular cut-outs 44 and 46, respectively. Cooperating grooves 48 and 50 are formed in the inner wall of the outer casing and to provide support each of the rings spans the annular space 16. Thus, the rings effectively define both the top and bottom boundary of what may be considered a dialyzing chamber.

As already generally discussed an extended length of dialyzing tubing 18 and supporting screen 20 is wrapped within the dialyzing chamber. One end of the membrane, by means of a connector unit 52, is connected to one of the blood inflow-outflow tubes. A second connector unit 54 connects the other end of the membrane to the other tube. In the figures the blood inflow tube 56 is represented as being coupled to connector unit 52 at the inner core whereas the blood outflow tube 58 is represented as being coupled to the connector unit 54 at the outer casing 12. This showing is solely for the purpose of illustration since the inflow and outflow of blood to and from the blood compartment could equally as well be reversed.

The membrane tubing 18 and supporting screen 20 are wrapped about the core in a fashion such that the membrane layers are supported and spaced apart from one another as well as from both the inner core and outer casing surfaces. Thus, the extended length of the supporting screen is greater than is the extended length of the membrane which may be of the order of from 200 cm to 500 cm. The physical dimensions are determined, in part, by factors such as screen and blood path thickness and the spatial distance between the inner core outer surface and the outer casing inner surface. The entire wrap (FIG. 1) is stationarily supported by these surfaces as well as by the rings 38, 40 and 42.

The connector units may be seen to best advantage in FIG. 6.

These units are substantially similar and therefore the following discussion will be directed to only the connector unit 54.

Each unit includes a substantially resilient body portion 60 and a relatively less flexible cup element 62. The body is elongated in one direction and is provided with a bore 64 passing generally centrally through the body in a direction normal to the axis of the elongated side. The blood outflow tube 58 is supported within the bore in any suitable fashion, as for example, by the provision of a bore enlargement at one end forming a shoulder 66 and the intercooperation of an enlarged collar 68 on the tube end.

One side of the body, that surface adjacent the bore enlargement, carries a plurality of grooves 70 extending between the bore and the periphery of the body. Since the membrane may and generally has a width greater than the length of the body the channels serve to substantially uniformly disburse, at the blood inflow to the membrane, the blood from a small diameter tube into the relatively larger area membrane and substantially evenly through the entrance to the blood channels formed in the membrane by the screen support. This will be discussed below.

Similarly, at the exit of the blood chamber, the channels in the body tend to unite the blood flow exiting the relatively larger area membrane thereby to pass this flow into the blood outflow tube 58.

The ends of the membrane are received over the body from the direction of the grooves 70 and bunched to some extent at the back surface. It may be desirable to adhere the membrane end to the back body surface to prevent displacement prior to securing the body in the cup element 62.

As shown in the figures the body is pressed into the cup 62. By closely conforming the internal cup dimension to that of the body and by forming the body of a substantially resilient material such as silicone rubber, resilient plastic or an equivalent elastomeric material the fit will be rather snug. At least one O-ring 72 supported by the body or else a projecting ring formed integral with the body insures a better fluid seal and prevents, further, the possibility that the membrane will pull loose.

The cup element of each connector unit is received in the wall of one of the inner core and outer casing. As is apparent from the FIG. 6 showing neither connector extends into the dialyzing chamber but rather extends into the inner core and without the outer casing. Therefore, if the inner core was to be closed at the top provision would have to be made to pass the blood inflow line through the closure.

Each cup is formed with a lip portion 74 which cooperates with a shoulder 76 in the wall 12 and 14. Therefore, each cup will rest upon a seat positioned such that the outer cup surface, contoured either convexly or concavely, as required, will define a smooth extension of the wall surface in which it is received. In this manner there will be an effective elimination of isolated pressure points which might otherwise be present if the connector units were partially disposed in the dialyzing chamber.

The connector units, in addition to insuring a more uniform blood distribution over the entire width of membrane upon entering the membrane, permits ease of assembly of the unit. The connector units are mounted generally perpendicular to the support screen and independently of the screen with the result that there is no introduction of pressure points in the blood compartment. This obviates or significantly eliminates blood pooling in the blood compartment. Further, the connector unit allows a large dimensioned membrane to be connected to a smaller tube without undue bunching and crimping of the membrane at the blood inlet-outlet tubes.

In operation, the artificial kidney coil 10 is disposed within a cannister module 80 of a dialysate delivery system including a line 82 through which by suitable pump means 84 dialyzing fluid is caused to pass. The artificial kidney coil is attached to the line by means of the threaded dialysate inflow spout 36.

Dialyzing fluid is pumped into the coil 10 and as indicated by the directional arrows is deflected substantially uniformly toward the outer casing by a plate 30, the lower surface of which is conical in shape. As further shown by the directional arrows the flow of dialyzing liquid continues into and through the dialyzing chamber 16 within which it contacts the membrane 18 and exits the chamber in an overflow into the cannister. Flow into the chamber is uniform due to the ring 38 which by means of the perforation acts as a diverter. As desired the dialyzing fluid may be recirculated in known fashion through the coil or removed from the system entirely as in single pass delivery. In FIG. 1 a volume 8b of dialzying fluid is maintained in the inner core and cannister serving as a reservoir prior to recirculation.

Through the circulation of dialyzing fluid within the dialyzing chamber and by contact with the membrane surface diffusion of organic and inorganic substances from the blood is accomplished. FIG. 7 shows in a greatly enlarged presentation a portion of the membrane 18, the support screen 20 and the several blood flow channels 90 and dialysate flow channels 92 impressed in the membrane by the screen. The membrane support serves in cooperation with the membrane to provide many important considerations which are outside the scope of this invention. Suffice it to say that the intercooperation serves to provide significant diffusion efficiency.

As briefly discussed above an important aspect of the invention is in connection with the incorporation of means for adjusting the positive pressure dialysate capability. This means comprises the adjacently spaced rings 40 and 42. As indicated each ring carries like and evenly spaced pluralities of perforations around their circumferences. By movement of one ring relative to the other the outflow resistance resulting from a change in the effective size of the perforation is changed. Consequently a positive pressure may be created within the dialzying chamber. Therefore, there will be a change in the pressure gradient across the membrane and a change in the amount of water diffusion through the membrane by ultrafiltration.

The various component parts of the construction, exclusive of the membrane which is generally formed of a cellulose base plastic and the connector body which is formed of silicone rubber or other suitable resilient plastic or elastomeric material, may be fabricated from one of the many plastics, as for example, polypropylene, polystyrene, polyethylene or of metal or equivalent material.

From the foregoing it will be seen from the above that in accordance with the present invention there is provided an improved coil dialyzing apparatus which performs the object and provides advantages heretofore not achieved in similar type devices.

Having described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

Having described the invention, what is claimed is:

1. A connector member for connecting tubing to a transversely larger, flexible, sheath-like conduit, said connector comprising a resilient body elongated and of generally oval shape in one direction and including a transverse bore, means for supporting and retaining said tubing within said bore, and means for confining in fluid-tight relationship said sheath-like conduit around the periphery of said body, said last named means comprising a relatively inflexible cup member having a bottom end defining an opening therein, said body being sealingly positioned within said cup member, said tubing being positioned within said bore and also positioned to pass through said opening, said sheath-like conduit being secured in fluid-tight relationship between said resilient body and said cup member, the surface of said body defining a plurality of grooves communicating with one end of said transverse bore and positioned to communicate with the interior of said conduit to facilitate the uniform distribution of fluid passing between said sheath-like conduit and said tubing, said grooves all extending in directions normal to the axes of said bore and sheath-like conduit.

2. The connector member of claim 1 wherein said means for confining said sheath-like conduit comprises a relatively infexible cup member having a bottom end defining an opening therein, said body being sealingly positioned within said cup member said tubing being positioned within said bore of the connector and also positioned to pass through said opening, said sheath-like conduit being secured in fluid-tight relationship between said resilient body and said cup member.

3. The connector member of claim 2 comprising at least one resilient substantially ring-like projection carried by said body to provide a fluid seal with said cup member.

4. The connector member of claim 3 wherein said body is made of an elastomer and the ring-like sealing projection is an integral part of said body.

* * * * *